(No Model.)
A. E. SMITH.
JOURNAL BEARING.
No. 475,990. Patented May 31, 1892.
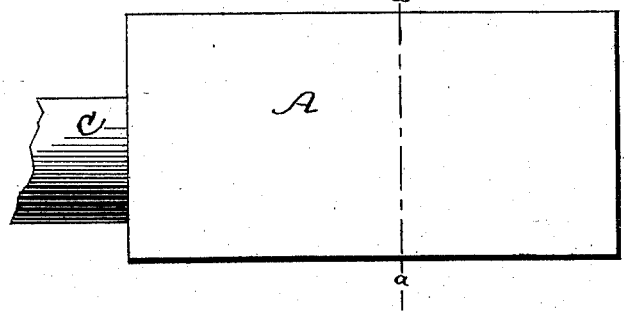
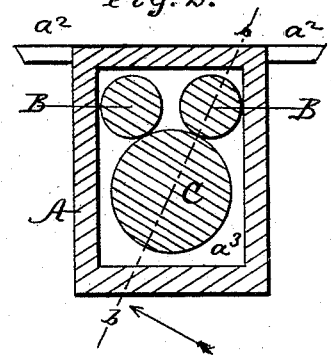
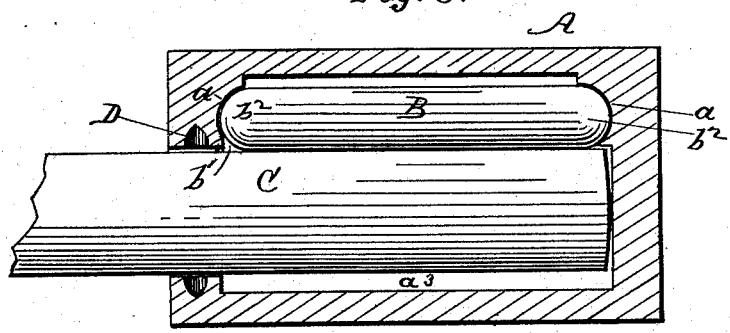
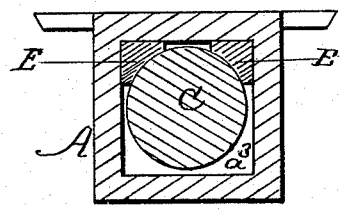
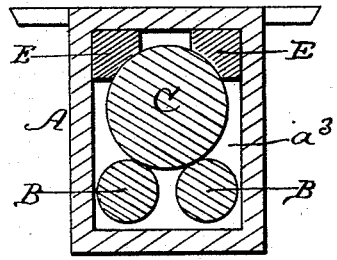
Witnesses
Thos. Houghton.
M. E. Cowell.
Inventor
Alfred E. Smith

UNITED STATES PATENT OFFICE.

ALFRED E. SMITH, OF BRONXVILLE, NEW YORK.

JOURNAL-BEARING.

SPECIFICATION forming part of Letters Patent No. 475,990, dated May 31, 1892.

Application filed November 25, 1890. Serial No. 372,584. (No model.)

*To all whom it may concern:*

Be it known that I, ALFRED E. SMITH, a citizen of the United States, residing at Bronxville, in the county of Westchester and State of New York, have invented new and useful Improvements in Journal-Bearings, of which the following is a specification.

The object of my invention is to make a journal-bearing which can be applied particularly to railroad-journals, where the bearings are placed upon the top or upper side of the journals and where the entire weight of a car with its load rests and where it is most difficult to overcome its friction, except at a great expense of power and material for bearings, which are constantly being destroyed or worn out by friction. My object, then, is to save that destruction and expense by making my bearings in such a way and placing them in such a position that friction will be reduced and power decreased and expense correspondingly saved, and in order to do that I take an angular-shaped box, usually a right-angled box closed at one end entirely, with a circular opening at the other end for the purpose of admitting the journal end, and then I place in two or more corners of the box removable bearings, either round rollers or angular-shaped, the latter with their angular sides resting against the inside angular sides of the box and their internal sides bearing against a revolving journal, which rests against the bearings at distances above and below, or above or below, the usual vertical points of bearing, thereby overcoming the dead pressure that exists when the bearings are placed above or on top or below and under the journal, as shown in Figures 2, 3, 4, and 5. I can place in the angles of the box either angular or cylindrical bearings and arrange them so that no bolts or rivets may be required to keep them in place, and when they are adjusted the bearings can be placed upon the journals, and the journals can then be made to revolve upon them with greatly-reduced friction.

This improvement is applicable to shafting as well as car-journals by simply inverting the bearings.

Fig. 1 shows a side elevation of a journal-box embodying my invention. Fig. 2 is a vertical cross-section of the same on line *a a* of Fig. 1. Fig. 3 is a central longitudinal section of the box on line *b b* of Fig. 2. Figs. 4 and 5 are modifications of the same.

Letter A shows angular box.
Letter B shows anti-frictional rollers.
C shows journal.
D shows sand-chamber.
E shows angular bearings.
*a* shows end bearings of rollers or sockets.
*b'* shows entrance for roller into its socket.
$b^2$ shows ends of rollers in sockets. $a^2$ shows lugs on box, and $a^3$ shows space in box.

In Figs. 2 and 3 I show the journal-box provided with cylindrical rollers or bearings B, arranged in the upper right-angled corners of the box and on opposite sides of the vertical axis of the journal, and these roller-bearings are held in place by contact with the journal and by fitting in the sockets *a* in the box. In Figs. 4 and 5, however, I show the bearings E, which are right-angled in cross-section, except on the inner sides opposite to the journal, said inner sides of the bearings E being concaved or curved to fit snugly to the journal, and thus afford bearings therefor. These right-angled bearings extend longitudinally of the box on opposite sides of the vertical axis of the journal, and said bearings fit snugly in the right-angled corners of the box and are held in place by said angular sides of the box and by the journal, with which the bearings are always in contact.

Having now described my invention, I desire a patent of the United States to be granted to me, and I claim—

1. In a journal-bearing, the box or frame A, having its corners right-angular in cross-section, and the bearings arranged and confined within the right-angled corners of the box or frame, combined with a journal which bears against the contact-surfaces of the bearings, said bearings being confined to positions on opposite sides of the vertical axis of the journal, substantially as and for the purpose described.

2. In a journal-bearing, the box or frame A, having the corners thereof made right-angular in cross-section and provided in its ends with sockets, combined with a journal, and the movable bearings extending longitudinally within said box or frame and supported in the right-angled corners thereof and the sockets therein, said bearings being in contact with the journal and arranged in the right-angled corners of the box or frame on oposite sides of the vertical axis of the journal, as and for the purpose described.

In testimony whereof I affix my signature in presence of two witnesses.

ALFRED E. SMITH.

Witnesses:
EMMA M. GILLETT,
S. F. RANDOLPH.